(12) United States Patent
Faber

(10) Patent No.: US 6,463,046 B1
(45) Date of Patent: Oct. 8, 2002

(54) METHOD AND APPARATUS FOR CONTROLLING A SEARCHER IN A CDMA COMMUNICATION SYSTEM

(75) Inventor: Ulrich Faber, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/449,548

(22) Filed: Nov. 29, 1999

(30) Foreign Application Priority Data

Nov. 27, 1998 (JP) .......................................... 10-337650

(51) Int. Cl.[7] .............................................. H04B 7/216
(52) U.S. Cl. ....................... 370/335; 370/342; 370/441; 370/458; 370/470; 375/140; 375/142; 375/147
(58) Field of Search ................................ 375/140, 142, 375/144, 145, 147, 130; 370/335, 342, 331, 320, 441, 458, 470, 465

(56) References Cited

U.S. PATENT DOCUMENTS 5,535,239 A 7/1996 Padovani et al. ........... 375/205
5,867,527 A * 2/1999 Ziv et al. .................... 370/335

FOREIGN PATENT DOCUMENTS

| JP | 6-501349 | 2/1994 |
|---|---|---|
| JP | 7-312783 | 11/1995 |
| JP | 10-51380 | 2/1998 |
| JP | 11-17646 | 1/1999 |
| JP | 11-55218 | 2/1999 |

* cited by examiner

*Primary Examiner*—Doris H. To
(74) *Attorney, Agent, or Firm*—Foley & Lardner

(57) ABSTRACT

In a method of controlling a searcher used in a receiver section supplied with a sequence of baseband reception data signals divisible into a sequence of frames, a current frame rate in a current frame is used to calculate a next frame rate in a next frame following the current frame and to determine candidate slots in the next frame with reference to the next frame rate. The searcher carries out searching operation within the candidate slots in the next frame. The next frame rate is calculated so that it is not higher then the current frame rate, so as to reliably carry out the search operation. The candidate slots in the next frame may be determined by a data burst randomizer.

18 Claims, 8 Drawing Sheets

METHOD AND APPARATUS FOR CONTROLLING A SEARCHER IN A CDMA COMMUNICATION SYSTEM

BACKGROUND OF THE INVENTION

This invention relates to a method of controlling a searcher used in a CDMA (Code Division Multiple Access) system and in particular, to a receiver section of a base station and/or a mobile terminal used in the CDMA system A recent attention tends to be focused on a CDMA system as a radio communication system which carries out communication between a base station and a plurality of mobile terminals by a radio signal within a service area or cell. This is because communication between the base station and a plurality of mobile terminals can be carried out by the same frequency within the same cell and, as a result, frequency resources can be effectively used in the CDMA system.

As such a CDMA system, a direct sequence (DS)-CDMA system has be known which directly modulates an information signal into a spread signal by a specific spread spectrum code unique to each mobile terminal. The DS-CDMA system makes it possible to spread the information signal into a very wide band. More specifically, communication from the base station to each mobile terminal is carried out through a forward link while communication from each mobile terminal to the base station is carried out through a backward or reverse link, in general, the forward link includes a pilot channel and a traffic channel while the reverse link includes a traffic channel without any pilot channel. At any rate, a receiver section of the base station and the mobile terminal must identify each channel from one another to detect a counterpart side on the communication.

In addition, it is to be noted in the CDMA system that the receiver section of each of the base station and the mobile terminal is given reception signals through different propagation paths which may be collectively called a multi-path and, therefore, the reception signals are inevitably subjected to interference on passing through the different propagation paths. Under the circumstances, the receiver section should reliably detect its own channel from the reception signals received through the multi-path. Taking this into consideration, the receiver section in the CDMA system is equipped with a searcher for searching its own channel which is arranged within a time slot predetermined for the receiver section.

In the interim, the abovementioned DS-CDMA system includes a mobile communication system of DS-CDMA which is implemented in compliance with the IS 95 standard prescribed by ANSI (American National Standards Institute). In the mobile communication system, communication from each mobile terminal to the base station is carried out through the reverse or uplink by using a sequence of burst like frames from each mobile terminal. This mobile communication system is helpful to save power consumption in each mobile terminal. Specifically, each of the frames is divided into sixteen slots for arranging an audio data signal or any other data signal given in a digital signal. In this event, the digital signal is usually obtained by encoding a sound signal into digital samples by a codec and by carrying out predetermined code conversion about the digital samples by a vocoder induded in the mobile terminal. Herein, it is to be noted that the digital samples are converted by the vocoder into different rates of the digital signal, as an amount of the digital samples is varied in each frame.

The digital signal of different rates is arranged in each frame at different frame rates determined by the number of data transmission slots in each frame. As a rule, the frame rates are classified into four rates, namely, a full rate, a half rate, a quarter rate, and an eighth rate. The digital signals are arranged in all of the slots in each frame at the full rate while the digital signals are arranged in half slots of sixteen slots at the half rate. Likewise, the quarter and the eighth rates are for arranging the digital signals in four and two slots included in each frame, respectively.

In U.S. Pat. No. 5,535,239 issued to Padovani et al, disclosure is made about a data burst randomizer which is used in a transmission system and which serves to determine power control groups in accordance with a predetermined algorithm by monitoring predefined bits in a previous frame However, Padovani et al never point out any problem which might occur on reception of the digital signals of variable frame rates.

Practically, when such digital signals of variable frame rates are received by a conventional receiver section, a searcher in the conventional receiver section is put into an active state, regardless of the frame rates of a reception signal. In other words, the searcher is always operated in tune with the full rate. Accordingly, when transmission is made at any other rates than the full rate, the searcher in the receiver section is uselessly operated and gives rise to a useless operation of any other peripheral circuits related to the searcher for a quiescent period namely, an unvoiced period. In other words, the probability of searching an unvoiced slot in the conventional searcher is determined by a voice activity, namely, a ratio of the voiced period to a whole time.

Moreover, such a useless searching operation in the searcher brings about deteriorating the quality of communication due to interference and noise caused to occur in the unvoiced period or slots.

Herein, consideration will be made about operation which is carried out in a mobile terminal during soft handoff procedure from a current base station to a new base station. In this event, the new base station can not detect a location of the mobile terminal before demodulation of a data signal arranged in the traffic channel, because of absence of any access channel in the reverse link. During the handoff procedure or operation, it is very important to accurately acquire a desired slot and to detect a data signal arranged in the traffic channel of the desired slot, so as to maintain the quality of communication and to avoid a call drop.

As mentioned above, when a searching operation of the searcher is executed in connection with slots which include no data. superfluous interference takes place not only during the soft handoff procedure but also during a normal communication, which results in degradation of the quality of communication.

SUMMARY OF THE INVENTION

It is an object of this invention to provide a method of controlling a searcher, which is capable of reducing any interference and noise to improve quality of communication.

It is another object of this invention to provide a method of the type described, which can reduce an amount of calculation necessary for searching a desired slot and which can improve power efficiency.

It is still another object of this invention to provide a receiver section which can effectively control the searcher and which can realize a high quality of communication.

It is yet another object of this invention to provide a CDMA system which can effectively search a desired slot A method to which this invention is applicable is for use in controlling a searcher in a CDMA system to receive a sequence of baseband reception data signals divisible into a plurality of frames each of which is divided into a plurality of slots and which has a frame rate determined by the number of the slots including the baseband reception data signals. According to an aspect of this invention, the method comprises the steps of calculating, in response to the baseband reception data signals arranged in a current one of the frames, burst candidate slot information representative of candidate slots in a next one of the frames following the current frame and controlling the searcher by the burst candidate slot information to make the searcher execute search operation within only the candidate slots in the next frame.

According to another aspect of this invention, the method comprises the steps of using a data burst randomizer to determine candidate slots which include the baseband reception data signals in a next one of the frames and operating the searcher during the candidate slots to make the searcher execute search operation within only the candidate slots in the next frame.

According to still another aspect of this invention, a receiver section is for use in a CDMA system to respond to a sequence of baseband reception data signals and to control a searcher included in a despread demodulator, the transmission data signal sequence being divisible into a plurality of frames each of which is divided into a plurality of slots and which has a frame rate determined by the number of the slots including the baseband reception data signals. The receiver section comprises a calculator, operable in response to the transmission data signal related to a predetermined one of the frames, for calculating candidate slots in a next frame following the predetermined frame and a control portion for controlling the searcher to make the searcher execute search operation within only the candidate slots in the next frame. dr

DESCRIPTION OF THE PREFERRED EMBODIMENTS

Figure 1:
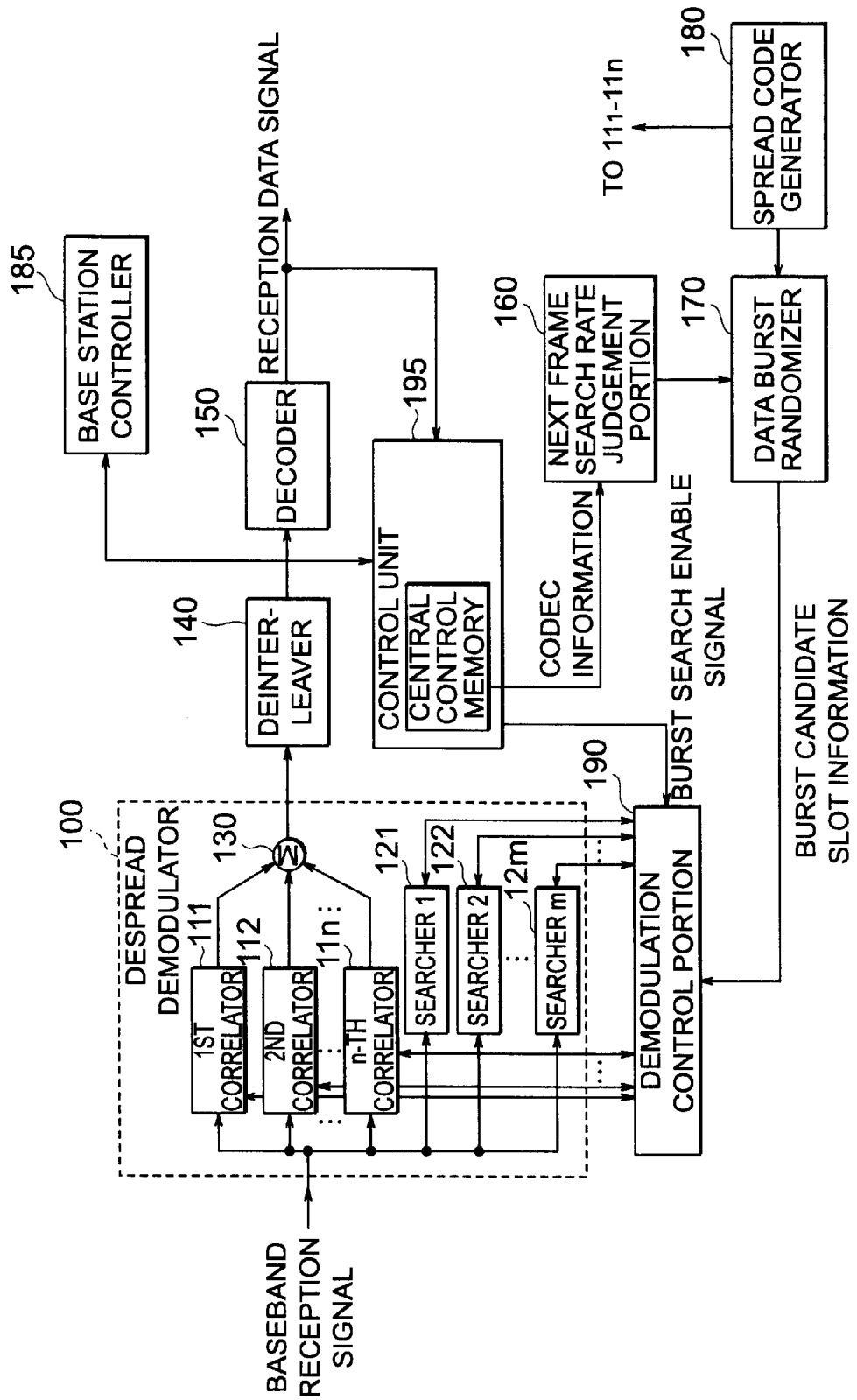
FIG. 1 shows a block diagram of a receiver section according to a first embodiment of this invention.

Referring to FIG. 1, a receiver section according to a first embodiment of this invention is applicable to a DS (direct sequence)-CDMA (code division multiple access) system which has a base station and a plurality of mobile terminals communicable with the base station The receiver section may be used in either the base station or each mobile terminal, although the following description will be mainly made on the assumption that the receiver section is included in the base station.

Herein, it is noted that the receiver section included in each base station is coupled to a base station controller 185 and is operated under control of the base station controller 185, as known in the art.

As shown in FIG. 1, the receiver section has a despread demodulator 100, a deinterleaver 140, and a decoder 150 all of which will be collectively referred to as a data receiver. Furthermore, the illustrated receiver section has a demodulation control portion 190, a data burst randomizer (will be often abbreviated to DBR) 170, a spreading code generator 180, a next frame search rate judgment portion 160, and a control unit 195. The control unit 195 is coupled to the base station controller 185 and has a central control memory for producing codec information under control of the base station controller 185.

Specifically, the demodulation control portion 190 is operable to control the despread demodulator 100 of the data receiver in a manner to be described later in detail. To this end, the illustrated demodulation control portion 190 is coupled to the control unit 195 and the DBR 170 and is supplied with a burst search enable signal and burst candidate slot information from the control unit 195 and the DBR 170, respectively. The burst search enable signal will be described later with reference to FIG. 2. It suffices to say that the burst search enable signal takes either a logic "1" level or a logic "0" level. On the other hand, the burst candidate slot information is sent from the DBR 170 in a manner to be mentioned later and is indicative of a slot candidate in a next frame.

The central control memory of the control unit 195 serves to store a data rate previously sent from the base station controller 185 and to produce the codec information in addition the control unit 195 also delivers the burst search enable signal to the demodulation control portion 190 under control of the base station controller 185.

In the example illustrated, it is assumed that the despread demodulator 100 is given, as an input signal, a baseband reception signal which is demodulated from a radio signal of a high frequency band according with the DS-CDMA and that the data receiver is operable as a baseband demodulator of a CDMA device. The baseband reception signal is transmitted from a mobile terminal (not shown) and is representative of a sequence of baseband reception data signals sent from the mobile terminal. In this connection, the baseband reception signal may be also called the transmission data signal sequence.

More specifically, the despread demodulator 100 has first through n-th correlators 111, 112, ..., 11n, a rake combiner or adder 130 for phase adjusting and summing up output signals from the first through the n-th correlators 111 to 11n, and first through mth searchers 121 to 12m, where n and m are positive integers The illustrated demodulator 100 is controlled by the demodulation control portion 190. In the example illustrated, the demodulation control portion 190 serves to control a search operation of each searcher 12i (i is an integer between 1 and m).

The next frame search rate judgment portion 160 is supplied with the codes information which is sent from the base station controller 185 and stored in the central control memory of the control unit 195. Furthermore, the next frame search judgment portion 160 calculates, on the basis of the codec information, a frame rate which is set at the beginning of the search operation in each searcher 12i. The frame rate set by the next frame search judgment portion 160 is given to the data burst randomizer (DBR) 170 together with a spreading code generated by the spreading code generator 180. Supplied with the frame rate and the spreading code, the DBR 170 calculates the burst candidate slot information.

Responsive to the burst search enable signal and the burst candidate slot information, the demodulation control portion 190 controls start times of the first through the m-th searchers 121 to 12m in accordance With a predetermined algorithm which will later be described. Therefore, the demodulation control portion 190 may be referred to as a control portion for controlling each searcher 12i included in the despread demodulator 100.

On the other hand, the spreading code generator 180 delivers the spreading codes not only to the DBR 170 but also to the first through the nth correlators 111 to 11n. The spreading codes are used in the first through the n-th correlators 111 to 11n to detect correlations between the baseband reception signal and the spreading codes, although not shown in FIG. 1. More specifically, the illustrated receiver section is used in the base station and, therefore, a plurality of the spreading codes are produced from the spreading code generator 180 to be delivered to the first through the n-th correlators 111 to 11n.

On the other hand, when the receiver section is used in the mobile terminal, a single spreading code assigned to the mobile terminal is generated by the spreading code generator 180.

When the illustrated receiver section is included in the base station, the receiver section monitors a traffic channel or a communication channel within an upward or a reverse link directed from each mobile terminal to the base station. However, the receiver section according to this invention may be used in each mobile terminal for receiving a forward or downward traffic channel in a downlink from the base station to each mobile terminal. At any rate, the DBR 170 serves to selectively suppress a slot or slots in each frame.

Taking the above into account, description will be made about operation of the receiver section illustrated in FIG. 1.

At first, the baseband reception signal is given as a sequence of baseband reception data signals by demodulating the radio signal by using an antenna, a high frequency amplifier, a mixer, a local oscillator, an intermediate frequency amplifier, and a demodulation circuit (not shown).

Herein, it is to be noted that a transmission signal which is modulated on a transmitter side in the manner determined in the DS-CDMA system is received through a plurality of paths. This shows that the baseband reception signal is reproduced by summing up a plurality of base band data signals passing through a plurality of different paths.

The despread demodulator 100 of the receiver section shown in FIG. 1 has the rake combiner 130 and produces a combined output signal. Inasmuch as the baseband reception signal is subjected to interleaving by a transmitter, the combined output signal may be called an interleaved baseband signal. The interleaved baseband signal is deinterleaved by the deinterleaver 140 into a deinterleaved baseband signal which is given to the decoder 150. The decoder 150 decodes the deinterleaved baseband signal into a reception data signal.

On the other hand, the next frame search rate judgment portion 160 calculates a search rate or a frame rate on the basis of a parameter specified by the codec information to designate a next frame rate in a next frame following a current frame.

Figure 2:
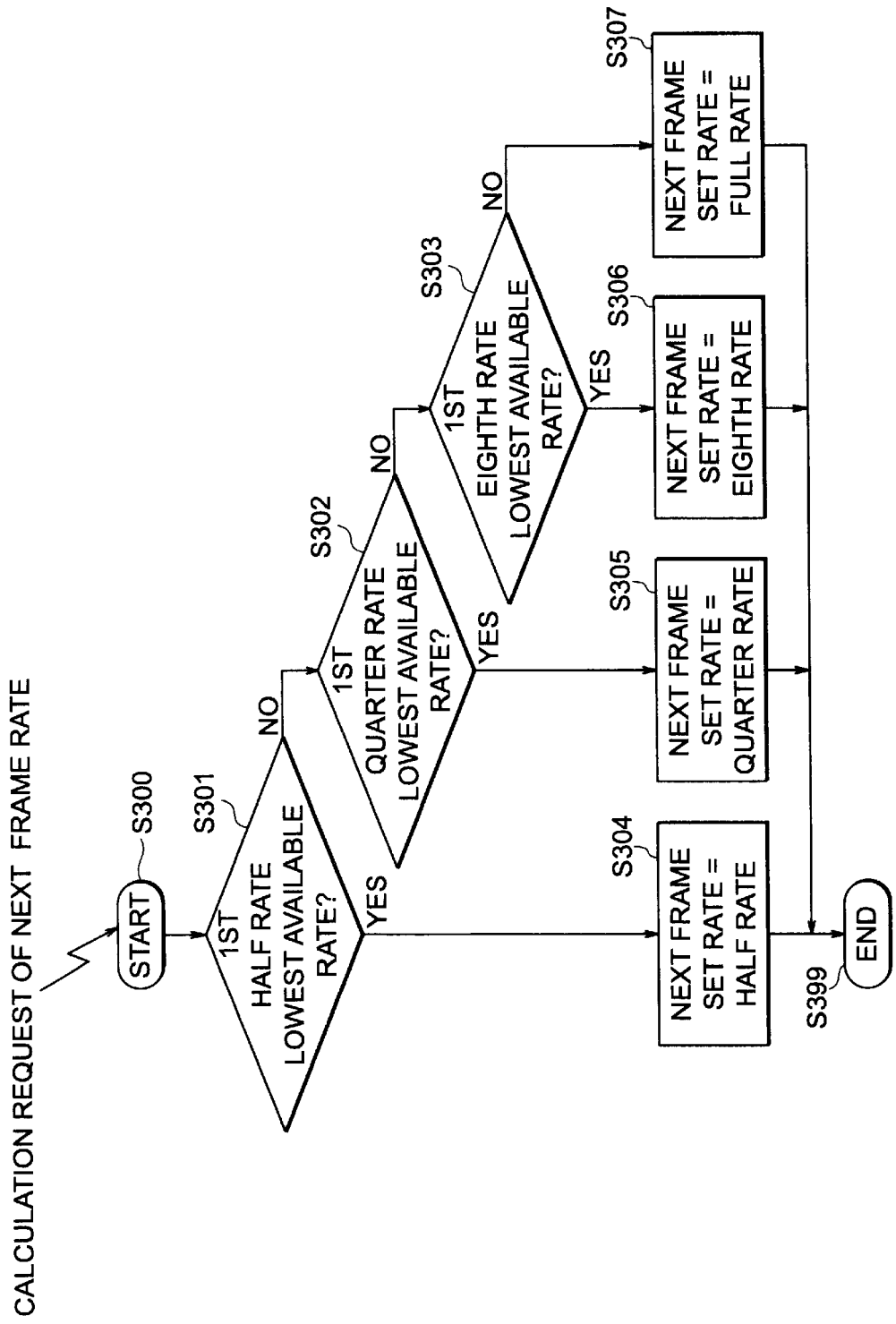
FIG. 2 shows a flow chart for use in describing operation of a next frame search rate judgment portion illustrated in FIG. 1.

Referring to FIG. 2, it is assumed that four rates are selectively used in each of frames. Under this condition, description will be made about operation of the next frame search rate judgment portion 160 in detail. The reception data signal is sent from the decoder 160 to the control unit 195. Responsive to the reception data signal, the control unit 115 produces, under control of the base station controller 185, the codec information which is indicative of the frame transmission rate. Alternatively, available rate information may be specified by a header of the transmission signal sent from a transmitter section.

At any rate, each transmission or frame rate may be specified by flags, as will be mentioned in conjunction with the codec information later. Herein, it is noted that the transmission frame rates can be classified into four frame rates composed of a full rate, a half rate, a quarter rate, and an eighth rate in the illustrated example. Accordingly, the flags serve to specify the full, the half, the quarter, and the eighth rates. In the example illustrated in FIG. 2, it is assumed that selection is made about a lowest one of the frame rates available in the next following frame.

The next frame search rate judgment portion 160 illustrated in FIG. 1 carries out operation in accordance with the algorithm illustrated in FIG. 2 under the above-mentioned conditions to select or determine a lowest rate as a next frame rate. Such selection of the lowest rate is effective to ensure the search operation in each searcher 12i by carrying out only on the slot containing data and, as a result, to reliably search each desired slot.

The DBR 170 is given the next frame search rate and the spreading code bits of the next frame calculated by the spreading code generator 110. The DBR 170 calculates, in accordance with a predetermined algorithm, the burst candidate slot which keeps the data signal and which may be called an available slot. According to the predetermined algorithm, it is prescribed that a burst candidate slot which is calculated at a low rate is always also included in a burst candidate slot which is calculated at a rate which is higher than the low rate. The predetermined algorithm for the DBR is used for determining an slot or power control group in a transmitter as the data burst randomizing algorithm in ANSI J-STD-008, 2.2.3.1.7.2.

However, it is noted in this invention that the predetermined algorithm for the DBR is used to monitor the data rates in the receiver section during each frame searching and to specify each slot available for searching operation in each searcher 12i. Specifically, when a single frame is assumed to be composed of sixteen slots, the burst candidate slot information is formed by sixteen bits. In this event, the logic "1" level represents that the corresponding slot is available for searching while the logic "0" level represents that the corresponding slot is not used for the searching. More specifically. when the half rate is set as the next frame rate, eight bits among the sixteen bits take the logic "1" levels. Likewise, if the quarter and the eighth rates are set as the next frame rate, four bits and two bits take the logic "1" levels in the sixteen bits, respectively, In FIG. 1, the demodulation control portion 190 supplies the searchers 12i to 12n of the despread demodulator 100 with a start time and a search time width for searching to control the searchers 121 to 12n. When the searcher 12i finishes the searching operation, peak time information at which an energy peak appears in the baseband reception signal is sent from each searcher 12i through the demodulation control portion 190 to the despread demodulator 100. The despread demodulator 100 controls the first through the n-th correlators 111 to 11n through the demodulation control portion 190 so that the energy per bit to noise ratio (Eb/No) becomes maximum in the rake combiner 130 through the demodulation control portion 190. Thus, the first through the n-th correlators 111 to 11n are operated in dependency upon the results obtained by each searcher 12i. In any event, an operation time or duration of the searcher 12i depends on the burst candidate slot information given from the data burst randomizer 170.

Figure 3:
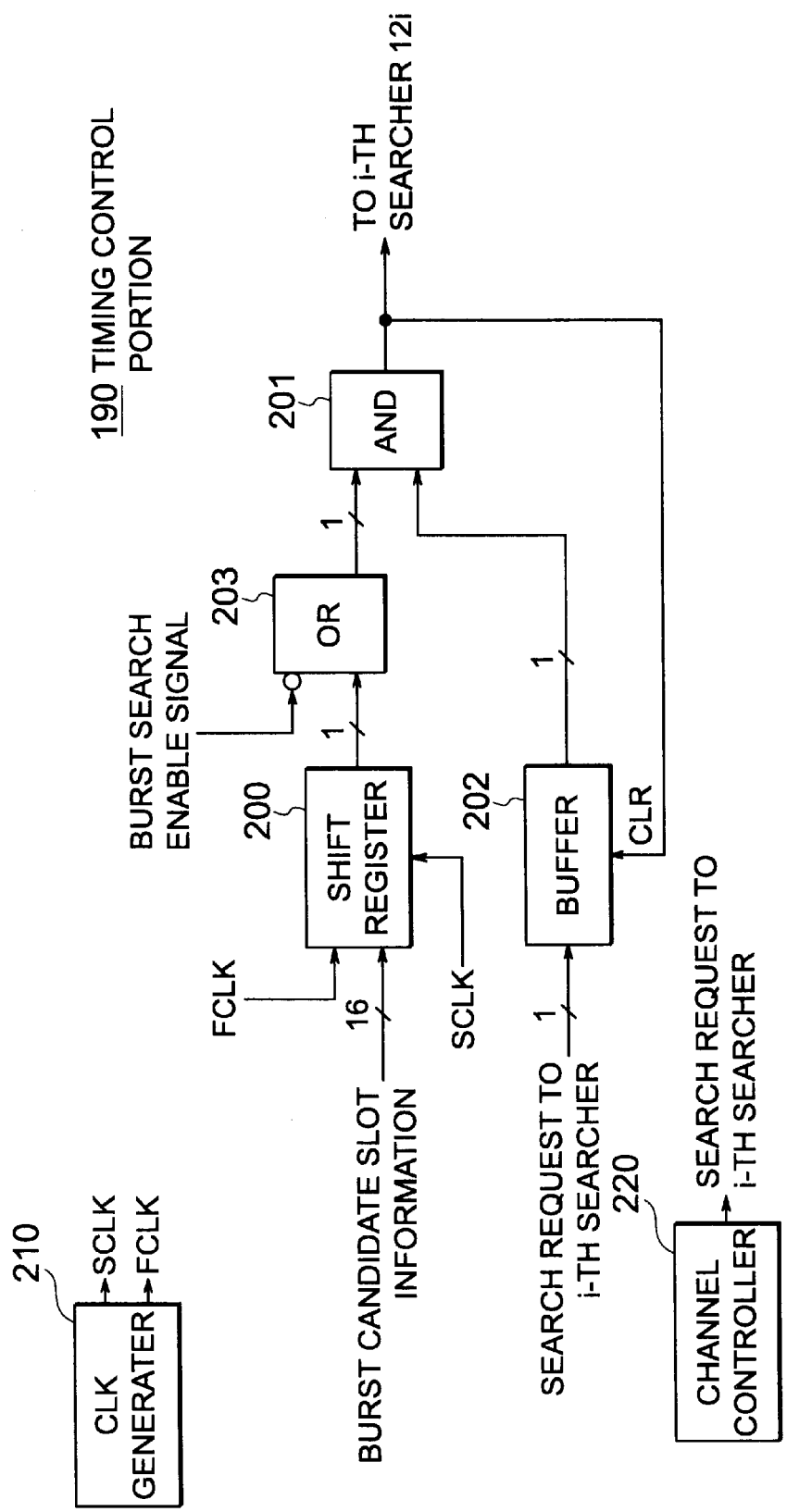
FIG. 3 shows a block diagram of a demodulation control portion used in the receiver section illustrated in FIG. 1.

Referring to FIG. 3, the demodulation control portion 190 has a timing control portion to control each searcher (specified by the i-th searcher 12i which is shown as a representative of the first through the m-th searchers 121 to 12m illustrated in FIG. 1). The illustrated timing control portion of the demodulation control portion 190 is supplied from the data burst randomizer 170 with the burst candidate slot information which is representative of slot candidates in the next frame and which is composed of sixteen bits. In the illustrated example, the burst candidate slot information of sixteen bits is given in parallel to a shift register 200, as shown in FIG. 3.

As shown in FIG. 3, the illustrated timing control portion includes a clock generator 210 for generating a frame clock FCLK and a slot clock SCLK and a channel controller 220 for producing a search request to the i-th searcher 12i. Both the clock generator 210 and the channel controller 220 are operable under control of the control unit 195 illustrated in FIG. 1.

The frame clock FCLK and the slot clock SCLK are delivered to the shift register 200 to store the burst candidate slot information in synchronism with the frame clock FCLK and to read the same bit by bit in synchronism with the slot clock SCLK. As a result, the burst candidate slot information is converted by the shift register 200 into a series of sixteen bits which is sent to an OR gate 203 as a serial bit sequence. In other words, parallel to serial conversion is carried out by the shift register 200.

Herein, it is to be noted that the logic "1" level of each bit of the serial bit sequence is indicative of an available slot corresponding to each bit while the logic "0" level is indicative of an unused slot which is not used for searching. Specifically, the available slot is a burst candidate slot which includes any data while the unused slot is a burst candidate slot which includes no data, as readily understood from the above.

The OR gate 203 illustrated in FIG. 2 is supplied from the control unit 195 with an inverted burst search enable signal on one hand and with the above-mentioned serial bit sequence on the other hand. The resultant OR gate 203 executes a logical OR operation between the inverted burst search enable signal and the serial bit sequence, This shows that, when the burst search enable signal takes the logic "1" level, the serial bit sequence is sent through the OR gate 203 as an OR gate output signal with the serial bit sequence kept unchanged. On the other hand, when the burst search enable signal takes the logic "0" level, the logic "1" level is always produced from the OR gate 203 as the OR gate output signal, regardless of the serial bit sequence.

The OR gate output signal is delivered to an AND gate 201 which is given the search request read out of the buffer 202 and the OR gate output signal sent from the OR gate 203. In consequences the AND gate 201 produces the logic "1" level signal as an AND gate output signal when both the OR gate output signal and the search request take the logic "1" levels, respectively. The AND gate output signal of the logic "1" level is sent to the i-th searcher 12i as a search operation start signal. This shows the i-th searcher 12i starts its searching operation only when the AND gate output signal takes the logic "1" level.

The AND gate output signal is fed back to the buffer 202 to clear the search request stored in the buffer when it takes the logic "1" level. Stated otherwise, the search request stored in the buffer 202 is cancelled by the AND gate output signal of the logic "1" level when the i-th searcher 12i starts the search operation in response to the search operation start signal sent from the AND gate 201.

Thus, the i-th searcher 12i executes the search operation within a slot indicated by the illustrated timing control portion of the demodulation control portion 190. In other words, the illustrated timing control portion can find the slot which is appropriate for the searching operation of the i-th searcher 1 2i.

More specifically, let the burst search enable signal take the logic "0" level and be indicative of a disable state. In this event, when the search request is issued from the channel controller 220 under control of the control unit 195, the search operation is executed in the i-th searcher 12i within a next slot immediately after the search request.

On the other hand, let the burst search enable signal take the logic "1" level and be indicative of the enable state. In this case, the i-th searcher 12i executes the search operation at the slot indicated by the burst candidate slot information sent from the data burst randomizer 170. The burst candidate slot information is indicative of the burst candidate slots which correspond to a lowest one of the rates, as described in conjunction with FIG. 2. This means that the search operation is executed at the lowest rate indicated by the burst candidate slot information and that the next frame rate is not higher than the current frame rte. Accordingly, a reliable search operation can be executed in each searcher 121 within the next frame.

Figure 4:
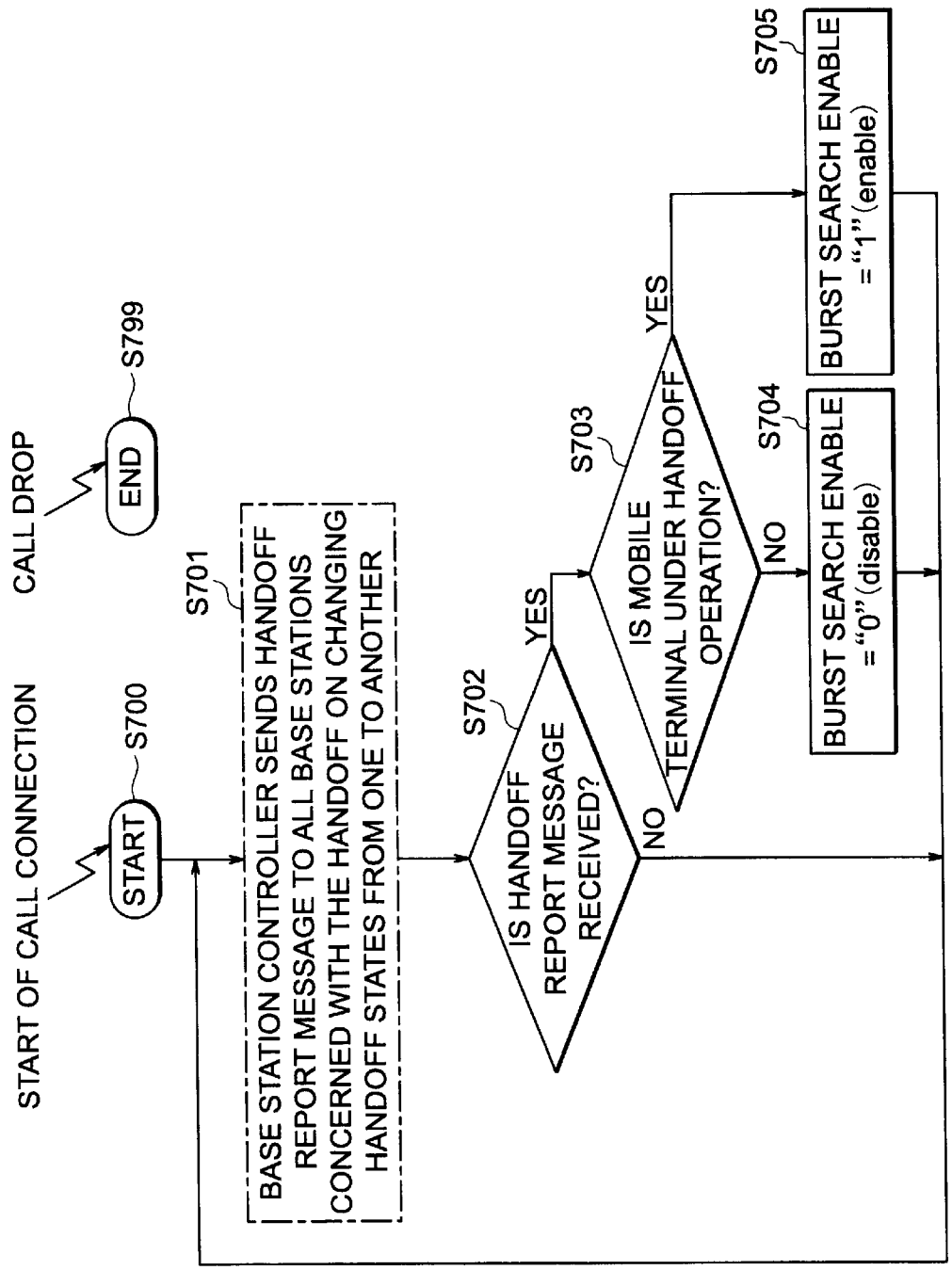
FIG. 4 shows a flow chart for use in describing production processing of a burst enable signal shown in FIG. 1.

Referring to FIG. 4, description will be made as regards the burst search enable signal which is illustrated in FIG. 1. In the illustrated example, the burst search enable signal is assumed to be produced in consideration of a handoff operation of a mobile terminal. In general, a handoff state is administrated by the base station controller 185 illustrated in FIG. 1 and is transmitted from the base station controller 185 to the control unit 195 (FIG. 1). The control unit 195 carries out processing in a manner illustrated in FIG. 4 to supply the burst search enable signal to the demodulation control portion 190. In other words, the control unit 195 executes processing illustrated in FIG. 4 in order to produce the burst search enable signal during the handoff state.

In this connection, each base station cooperates with the base station controller to execute the handoff procedure.

At first, the processing is started at a step S700 when a call connection is required between the base station (FIG. 1) and a mobile terminal (not shown). If the call is disconnected or dropped for any reason, the processing is finished as shown at a step S799.

When the handoff states are changed between the mobile terminal and the other base stations except the illustrated base station, the base station controller 185 sends a handoff report message to all of the base stations concerned with the handoff procedure of the mobile terminal, as shown at a step S701. The control unit 195 of each base station checks at a step S702 whether or not the handoff report message is received. If no handoff report message is received, the step 8702 is returned back to the step S701 or S702.

When the handoff report message is received at the step S702, the control unit 195 of each base station monitors at a step S703 whether or not the mobile terminal in question is under the handoff operation.

Unless any handoff operation is being executed by the mobile terminal in question, the step S703 is followed by a step S704 at which the burst search enable signal becomes the logic "0" level and, as a result, the base station is put into the disable state related to the searching operation. Subsequently, the step S704 is succeeded by the step S701 or S702.

On the other hand, if the handoff operation is being executed by the mobile station in question, the step 703 proceeds with a step 705 at which the burst search enable signal becomes the logic "1" level and, consequently, the base station is put into the enable state for the searching operation. Thereafter, the processing is returned back to the step S701 or S702.

At any rate, the burst search enable signal is delivered to the OR gate 203 of the demodulation control portion 190 illustrated in FIG. 3.

Referring to FIG. 3 together with FIG. 4, every one of the slots in each frame can be searched by each searcher 12i when the handoff operation is not executed. On the other hand, when the handoff operation is being executed by the mobile terminal in question, the searching operation can be made in each base station 12i only about the slots which are indicated as the burst candidate slots by the burst candidate slot information.

Figure 5:
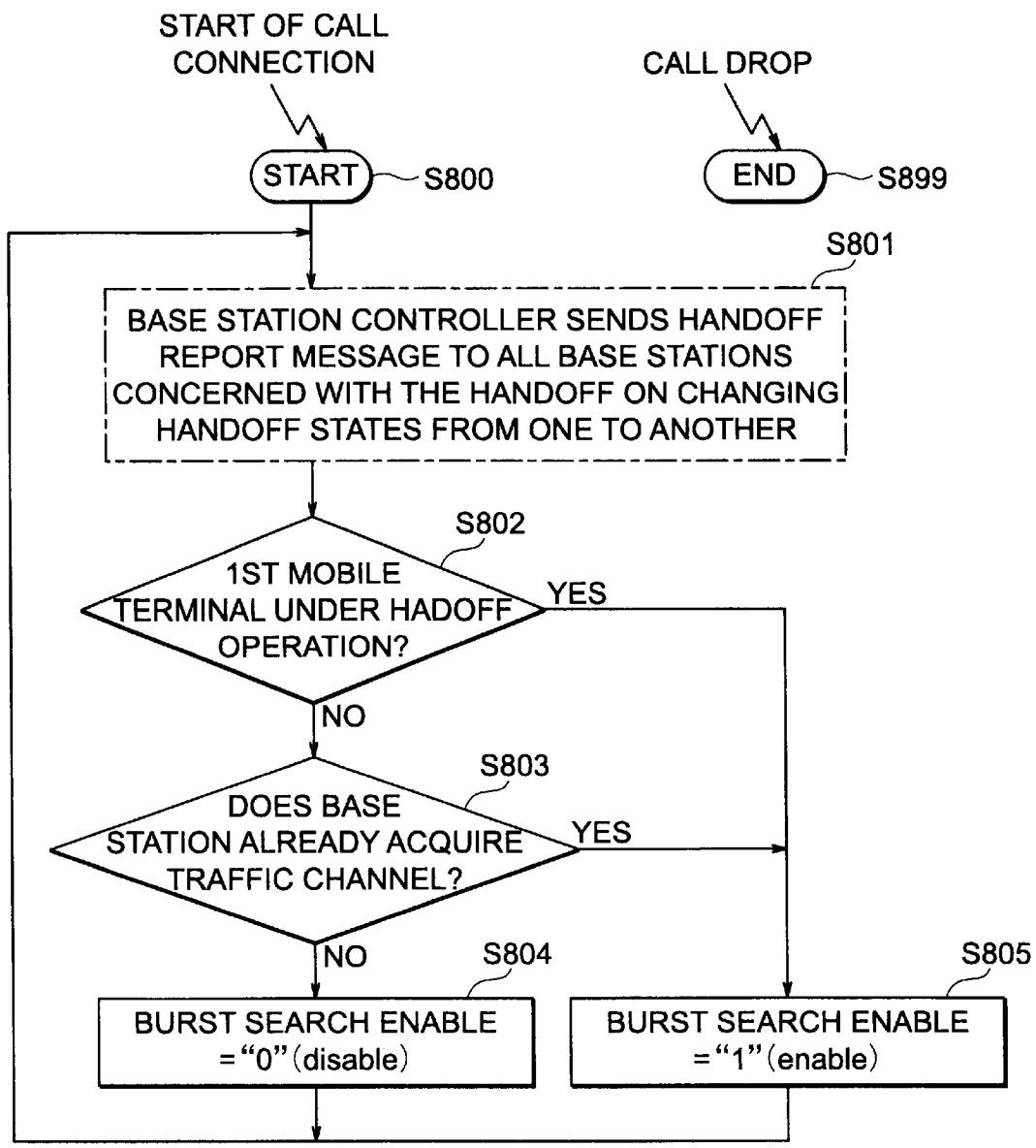
FIG. 5 shows another flow chart for describing another production processing of the burst enable signal.

Referring to FIG. 5, description will be made about a modification of the processing illustrated in FIG. 4 that is executed to produce the burst search enable signal. Like in FIG. 4, a call connection is started at a step S800 and the base station controller sends the handoff report message to all of the base stations that are concerned with the handoff operation of the mobile terminal in question at a step 3801. On the other hand, the call is disconnected or dropped at a step S899 like the step S799 in FIG. 4.

At a step S802, each base station that receives the handoff report message sets the handoff state of the mobile terminal in question in accordance with the handoff report message and thereafter detects whether or not the mobile terminal in question is now under the handoff operation.

If the mobile terminal in question is under the handoff operation, the step S802 is followed by a step S805 at which the burst search enable signal is set into the logic "1" level. Thereafter, the processing is returned back to the step S801 or S802. On the other hand, if the mobile terminal in question is under no handoff operation, the step S802 is succeeded by a step S803 for detecting whether or not the base station already acquires a traffic channel assigned to the mobile terminal in question. When the traffic channel is not acquired yet by the base station. the step S803 is followed by a step S804 at which the burst search enable signal is set into the logic "0" level to specify the burst search disable state and which is thereafter succeeded by the step S801 or S802.

If the traffic channel is already acquired by the base station, the step S803 is followed by a step S805 at which the burst search enable signal is set into the logic "1" to specify the burst search enable state. Subsequently, the step S805 proceeds to the step S801 or S802.

In the above-mentioned system according to the first embodiment, the data burst randomizer 170 produces, during the handoff operation, the burst candidate slot information indicative of the slots which are indicated at the lowest rate. In this connection, the search operation in the searcher 12i is executed only during the burst candidate slots designated by the burst candidate slot information With this structure, the searcher 12i can execute the searching operation in relation to a high energy path and can reliably acquire the path. Stated otherwise, it is possible to prevent the searcher 12i from uselessly searching a slot which has no data and from acquiring a path which is subjected to high interference. That is effective to decrease occurrence of a call drop during the handoff operation and to improve quality of communication.

In addition, the illustrated structure is inexpensive because it can be implemented by adding a minimum amount of elements to a basic receiver section used in the DS-CDMA system.

Figure 6:
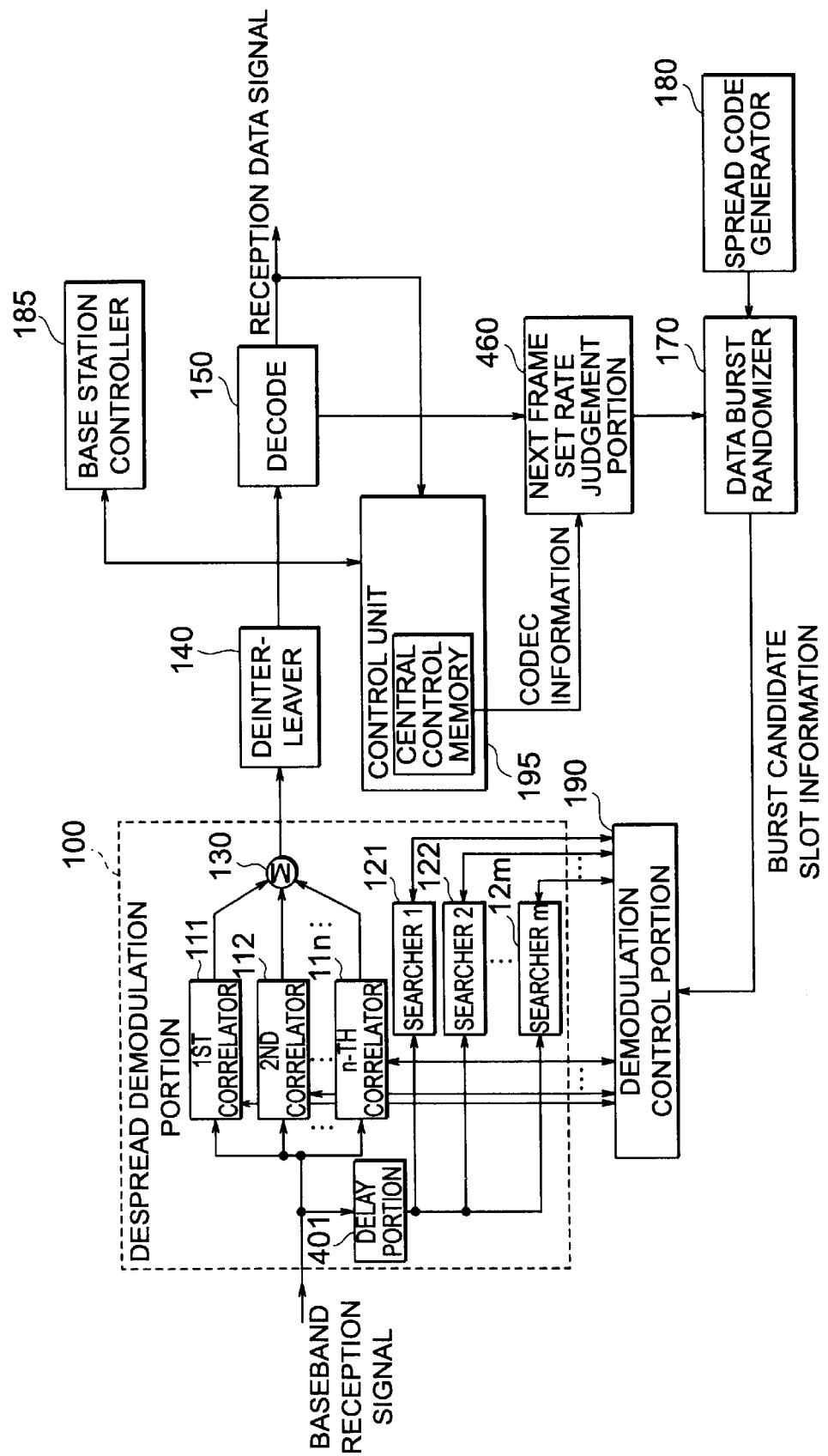
FIG. 6 shows a block diagram of a receiver section according to a second embodiment of this invention.

Referring to FIG. 6, a receiver section according to a second embodiment of this invention comprises is similar in structure and operation to that illustrated in FIG. 1 except that a delay unit. 401 is included in the despread demodulator 100 in FIG. 6 and no burst search enable signal is given from the control unit 195 to the demodulation control portion 190 in the illustrated example, a next frame set rate judgment portion 460 is included instead of the next frame search rate judgment portion 160 illustrated in FIG. 1.

Like in FIG. 1, the despread demodulator 100, the deinterleaver 140, and the decoder 150 serve as a data receiver for receiving the baseband reception signal to produce the reception data signal or a decoded data signal. With this structure, the baseband reception signal is delivered direct to the first through the n-th correlators 111 to 11n on one hand and to the first through the m-th searchers 121 to 12m through the delay portion 401 on the other hand. The rake combiner 130 sums up first through n-th output signals phase-adjusted by the first through the n-th correlators 111 to 11n to produce a combined signal.

The illustrated delay portion 401 is operable to compensate for a delay time which occurs in a loop which is formed from the first through the n-th correlators 111 to 11n to the demodulation control portion 190 through the deinterleaver 140, the decoder 150, and so on. Such a delay time can be previously calculated and determined and may be called a predetermined process delay. In addition, the despread demodulator 100 also includes the first through the m-th searchers 121 to 12m connected to the delay portion 401 and is controlled by the demodulation control portion 190, like in FIG. 1.

The decoder 150 reproduces the data signal sent from the deinterleaver 140 into the reception data signal and also detects a frame rate of a current frame. The reception data signal is sent to an external device in a manner similar to that illustrated in FIG. 1 and also to the control unit 195 while the frame rate is delivered from the decoder 150 to the next frame set rate judgment portion 460. The control unit 195 supplies the next frame set rate judgment portion 460 with the codec information of four bits produced under control of the base station controller 185 and obtained by a result of negotiation with the mobile terminal. Each one of the four bits of the codec information may be called a flag, as described in conjunction with FIG. 1. The codec information of four bits is arranged from a most significant bit to a least significant bit and indicates which one of the rates is used and is not used for communication between the mobile terminal and the base station. In the example illustrated, the most and the least significant bits are representative of the full rate and the eighth rate, respectively, while two intermediate bits between the most and the least significant bits are representative of the half and the quarter rates, respectively. For example, when the codec information is specified by the pattern of "0101", it stands for using only the half rate and the eighth rate in the frame. Supplied With the frame rate and the codec information, the next frame set rate judgment portion 460 calculates the frame rate which needs to start the searcher operation and which may be called a calculated frame rate. The calculated frame rate is given to the data burst randomizer 460 together with the spreading code bits from the spreading code generator 180. The data burst randomizer 170 is operable in response to the calculated frame rate and the spreading code to calculate, in compliance with the predetermined algorithm, the burst candidate slot information which is representative of candidate slots in the next following frame.

The illustrated demodulation control portion 190 controls start times of the first through the math searchers 121 to 12m with reference to the burst candidate slot information sent from the data burst randomizer 170.

In the above-mentioned description related to FIG. 6, it is assumed that the receiver section is used in the base station to selectively suppress the slots in each frame by the use of the data burst randomizer 170. However, similar operation may be also executed in connection with a downward communication channel from the base station to the mobile terminal. This shows that the receiver section illustrated in FIG. 6 may also be included in the mobile terminal.

In the receiver section illustrated in FIG. 6, the burst candidate slots are searched not only during the handoff operation but also during any other time than the handoff operation. As a result, only the burst candidate slots are always searched in the receiver section illustrated in FIG. 6.

In the receiver section used in the DS-CDMA system, the decoder 150 illustrated in FIG. 6 decodes a deinterleaved signal from the deinterleaver 140 into the reception or the decoded data signal at every frame and calculates the frame rate in each frame, as mentioned before The next frame set rate judgment portion 450 calculates which one of the frame rates is to be set as a frame rate candidate in the next frame, on the basis of the current frame rate and a parameter indicated by the codec information.

Figure 7:
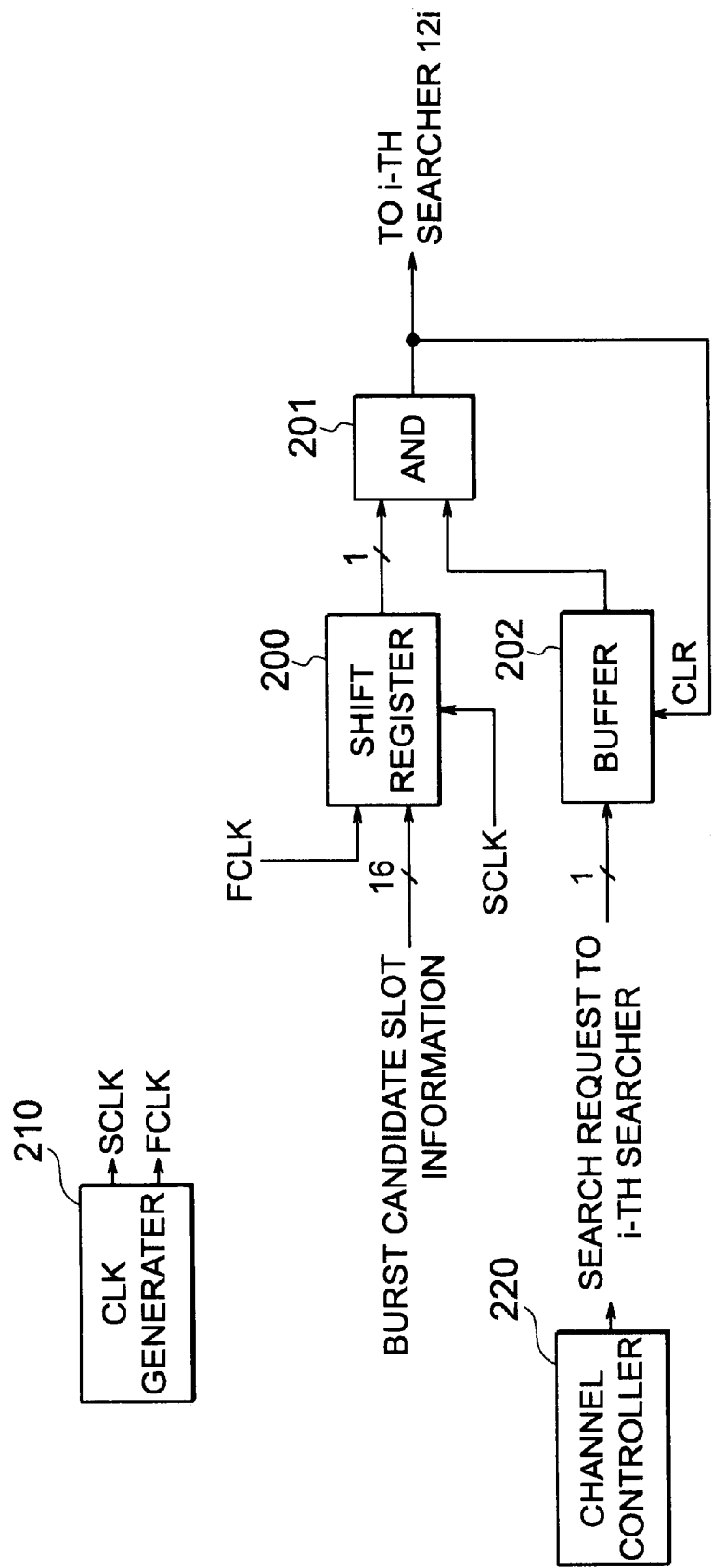
FIG. 7 shows a block diagram of a demodulation control portion illustrated in FIG. 6.

Referring to FIG. 7, a timing control portion will be described which is included in the demodulation control portion 190 used in the receiver section illustrated in FIG. 6. As shown in FIG. 7, the timing control portion is similar in structure and operation to that illustrated in FIG. 2 except that no OR gate is included in the timing control portion illustrated in FIG. 7. In other words, the AND gate output signal produced from the AND gate 201 is generated as the search start signal without depending upon the burst search enable signal in the illustrated timing control portion. This shows that the searcher 12i is controlled only by the burst candidate slot information, regardless of the burst search enable signal, and, as a result, the searcher 12i is operated only during the burst candidate slots.

More specifically the illustrated timing control portion is supplied from the data burst randomizer (DBR) 170 with the burst candidate slot information of sixteen bits in parallel. The burst candidate slot information is stored in parallel in the shift register 200 in synchronism with the frame clock FCLK sent from the clock generator 210. Thereafter, the stored burst candidate slot information of sixteen bits is serially read out of the shift register 210 in synchronism with the slot clock SCLK and, as a result, the burst candidate slot information given in bit parallel is converted into a serial candidate slot information signal by the shift register 200. Thus, the serial candidate slot information signal is sent direct to the AND gate 201 bit by bit. As described in conjunction with FIG. 2, the slot is available for searching when the burst candidate slot information takes the logic "1" level while the slot is unavailable for the searching when the burst candidate slot information takes the logic "0" level.

Like in FIG. 2, a search request signal of the logic "1" level is issued from the channel controller 220 to the buffer 202 in the presence of the search request to the i-th searcher 12i. In consequence, the buffer 202 delivers the logic "1" level signal to the AND gate 201 in response to the search request to the ith searcher 12i.

As readily understood from FIG. 7, the AND gate 201 produces the logic "1" level as the AND gate output signal and sends the AND gate signal to the i-th searcher 12i only when both the search request signal and the serial candidate information signal take the logic "1" levels. The AND gate output signal of the logic "1" level is delivered not only to the i-th searcher 12i as the search start signal but also to the buffer 202. The AND gate output signal of the logic "1" level is given to the buffer 202 as the clear signal (CLR) and the search request signal stored in the buffer 202 is cancelled by the clear signal (CLR).

With this structure, the AND gate output signal of the logic "1" level is produced as the search start signal only when the burst candidate slot information takes the logic "1" level, if the search request is issued. In other words, the search start signal in FIG. 7 is produced regardless of the burst search enable signal mentioned in conjunction with FIG. 2.

Accordingly, the illustrated timing control portion indicates only the slots that are appropriate for the searching in response to the burst candidate slot information. In other words, the searching operation is executed within only the slots designated by the burst candidate slot information in the next frame. This shows that the searching operation can be carried out only about the slots which always include the data signals.

Figure 8:
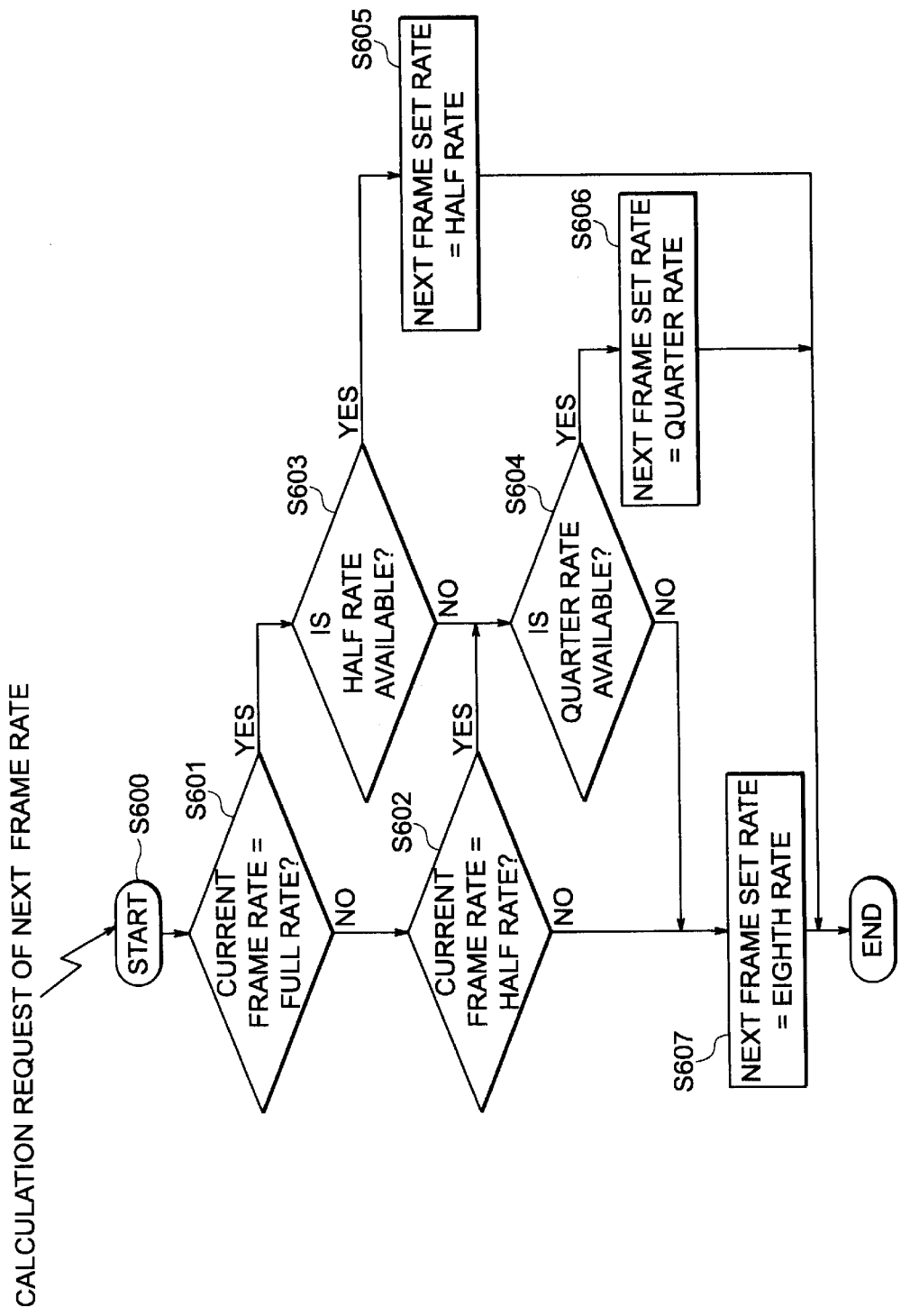
FIG. 8 shows a flow chart for use in describing operation of a next frame set rate judgment portion illustrated in FIG. 6.

Referring to FIG. 8, description will be made about operation of the next frame set rate judgment portion 460 illustrated in FIG. 6. Herein, it is assumed that the illustrated next frame set rate judgment portion 460 has four variable rates composed of the full rate, the half rate, the quarter rate, and the eighth rate and is supplied with the frame rate information from the decoder 150. Practically, such frame rate information may be included in a header portion of the transmission data signal sent from the mobile terminal in the illustrated example, as mentioned above. Each of the full, the half, the quarter, and the eighth rates can be specified by a flag put in a predetermined region of the transmission data signal.

In FIG. 8, it is surmised that a request is made about a reception call from a mobile terminal to the base station illustrated in FIG. 6 and that the request is transmitted within a current frame. When a reception call based on such a request is given from the mobile terminal, the base station is initialized into a state of the full rate. On the other hand, when a request is made from the mobile terminal to carry out the soft handoff or hard handoff, the illustrated base station is initialized into a state of the eighth rate.

Taking the above into consideration, let a rate calculation request be issued from the base station controller 185 to the next frame set rate judgment portion 460 through the control unit 195 to determine a rate in the next following frame as a next frame rate. In this case, the next frame set rate judgment portion 460 of the base station calculates the next frame rate on the basis of the current frame rate and available rate information in a manner to be mentioned below.

At first, the next frame set rate judgment portion 460 checks whether or not the current frame is set into the full rate, as shown at a step S601 in FIG. 8. When the current frame rate becomes equal to the full rate in the base station, the step S601 proceeds to a step S603 of checking whether or not the half rate is being used with reference to the codec information when the half rate is used in the receiver section, the step S603 is followed by a step S605 of setting the half rate as the next following set rate and processing is thereafter finished.

On the other hand, when the current frame rate is different from the full rate, the step S601 is succeeded by a step 3602 of checking whether or not the current frame rate is equal to the half rate. If the current frame rate becomes equal to the half rate, a step 3604 is executed after the step S602 to detect whether or not the quarter rate is available or can be used in the next following frame. If the quarter rate is available, the step S604 proceeds to a step S606 at which the quarter rate is set as the next following rate of the next frame and, thereafter, processing is finished.

When the current frame rate is judged at the step S602 to be not equal to the half rate or when judgment is made at the step S604 about the fact that the quarter rate is not available, a step S607 is executed to set the next frame set rate into the eighth rate and processing comes to an end. In the above-mentioned manner, the next frame set rate judgment portion 460 determines the next frame set rate and may be called a rate judgment circuit.

Turning back to FIG. 6, the next frame set rate is delivered to the data burst randomizer (DBR) 170 which is supplied with a sequence of the spreading code bits used for the next frame. The DBR 170 calculates the burst candidate slots included in the next frame in accordance with the predetermined algorithm. The predetermined algorithm is based on the assumption that burst candidate slots calculated at a prescribed low rate are always included in burst candidate slots calculated at a rate which is higher than the prescribed low rate, as mentioned in conjunction with FIG. 1.

Specifically, let each frame be composed of sixteen slots that are specified by sixteen bits, respectively. In this case, it is assumed that the logic "1" and "0" levels are representative of the slots which are available and unavailable for searching, respectively. Under the circumstances, if the next frame set rate is equal to the half rate, eight bits take the logic "1" levels among the sixteen bits while the next frame set rate is equal to the quarter rate, four bits take the logic "1" levels among the sixteen bits. Likewise, two bits alone take the logic "1" levels among the sixteen bits at the eighth rate, At any rate, a combination of the next frame set rate judgment portion 460 and the DBR 170 is operable to calculate the candidate slots in the next frame and may be referred to as a candidate slot calculator.

The demodulation control portion 190 controls the despread demodulator 100 by supplying the searchers 12$i$ with the start time and the searching time width. When the searchers 12$i$ finish searching operation, each searcher 12$i$ informs the despread demodulator 100 of peak times at which an energy peak appears in the baseband reception signal within the searching time width. Specifically, the peak times are sent to the correlators 111 to 11$n$ as searching processing results. In the despread demodulator 100, the correlators 111 to 11$n$ are controlled by the searching processing results so that an energy to noise (or interference) becomes maximum at the rake combiner 130. To this end, the start time of each searcher 12$i$ is determined by the use of the burst candidate slot information. Thus, the demodulation control portion 190 controls each searchers 12$i$ by the burst candidate slot information to make the searcher 12$i$ execute the search operation within only the candidate slots in the next frame and may be called a control portion for controlling the searcher 12$i$.

In the example illustrated in FIG. 6, the delay portion 401 serves to compensate for a delay time which occurs from a reception time of the current frame data signal until calculation for the burst candidate slots is finished in the next frame.

In the DS-CDMA mobile communication system, the receiver section which is illustrated in FIG. 6 includes the DBR (Data Burst Randomizer) like in FIG. 1. A specific frame rate of the decoded frame or current frame is specified among at least three frame rates. Under the circumstances, a next frame rate of the next frame following the current frame is calculated on the basis of a candidate rate which is obtained by the specific frame rate and which is lower than the specific frame rate by a single rate. In other words, the burst candidate slots of the next frame are searched at the next frame rate lower than the current frame rate. From this fact, it is to be understood that the searching operation can be executed in connection with only the slots that include the data signals not only during the handoff operation but also at all times.

Accordingly, the receiver section according to this invention is advantageous in that useless searching operation can be avoided which might be carried out about slots including no data signals and which might result in receiving a path subjected to high interference At any rate, the receiver section according to this invention is very effective to improve quality of communication in addition, this invention can avoid a frequent searching operation by effectively searching only the slots including the data signals. This brings about an improvement of power efficiency and a reduction of an amount of calculation.

In the above-mentioned embodiment also, the search operation may be executed during the handoff operation at a lowest one of the rates prepared in the receiver section According to this structure, it is possible for each searcher to reliably acquire a path which has high energy and to avoid useless search operation resulting from searching the slots of no inclusion of any data. This shows that call drop can be reduced during the handoff operation and the quality of communication can be improved.

While this invention has thus far been described in conjunction with a few embodiments thereof, it will readily be possible for those skilled in the art to put this invention into practice in various other manners. Although the data burst randomizer (DER) is used to determine the slots in the next following frame with reference to the current frame rate, this invention may not be restricted to the receiver section which includes the DBR but may be applicable to a receiver section which includes any other circuit for determining next slots from the current frame rates. In addition, this invention is also applicable to the mobile terminal to search slots. In this event, a single searcher and a single spreading code generator may be included in the mobile terminal together with the circuit, such as the DBR for determining next slots in a next following frame to a current frame.

What is claimed is:

1. A method of controlling a searcher in a CDMA system to receive a sequence of baseband reception data signals divisible into a plurality of frames each of which is divided into a plurality of slots and which has a frame rate determined by the number of the slots including the baseband reception data signals, comprising the steps of:

calculating, in response to the baseband reception data signals arranged in a current one of the frames, burst candidate slot information representative of candidate slots in a next one of the frames following the current frame; and controlling the searcher by the burst candidate slot information to make the searcher execute search operation within only the candidate slots in the next frame.

2. A method as claimed in claim 1, the frame rate being composed of a plurality of frame rates from a highest one to a lowest one, wherein the calculating step comprises the steps of:

determining a current one of the frame rate;

judging a next one of the frame rate that is not higher than the current one of the frame rate; and producing the burst candidate slot information with reference to the next frame rate by using a data burst randomizer.

3. A method as claimed in claim 2, wherein the controlling step comprises the steps of:

producing a burst search enable signal when a handoff operation is executed;

determining the candidate slots with reference to the burst search enable signal and the burst candidate slot information; and operating the searcher during each of the candidate slots of the next frame.

4. A method as claimed in claim 3, wherein the producing step comprises the steps of:

judging whether or not a handoff operation is executed;

monitoring whether or not a traffic channel is acquired; and providing the burst search enable signal during execution of the handoff operation and on acquisition of the traffic channel.

5. A method as claimed in claim 2, wherein the controlling step comprises the steps of:

determining the candidate slots only with reference to the burst candidate slot information; and operating the searcher during each of the candidate slots of the next frame.

6. A method as claimed in claim 1, further comprising the steps of:

delaying the baseband reception data signals to produce delayed baseband reception data signals; and supplying the searcher with the delayed baseband reception data signals to adjust the candidate slots in the searcher.

7. A method as claimed in claim 1, the frame rate being composed of a full rate, a half rate, a quarter rate, and an eighth rate, wherein the calculating step comprises the steps of:

judging which one of the frame rates the current one of the frames is given to produce a current one of the rates;

selecting a next one of the rates that is not higher than the current rate; and determining the candidate slots by a data burst randomizer in response to the next rate.

8. A method of controlling a searcher in a CDMA system to receive a sequence of baseband reception data signals divisible into a plurality of frames each of which is divided into a plurality of slots and which has a frame rate determined by the number of the slots including the baseband reception data signals, comprising the steps of:

using a data burst randomizer to determine candidate slots which include the baseband reception data signals in a next one of the frames: and operating the searcher during the candidate slots to make the searcher execute search operation within only the candidate slots in the next frame.

9. A receiver section for use in a CDMA system to respond to a sequence of baseband reception data signals and to control a searcher included in a despread demodulator, the transmission data signal sequence being divisible into a plurality of frames each of which is divided into a plurality of slots and which has a frame rate determined by the number of the slots including the baseband reception data signals, comprising:

a calculator, operable in response to the transmission data signal related to a predetermined one of the frames, for calculating candidate slots in a next frame following the predetermined frame; and a control portion for controlling the searcher to make the searcher execute search operation within only the candidate slots in the next frame.

10. A receiver section as claimed in claim 9, the CDMA system being for use in communication between a base station and a mobile terminal, the receiver section being used in the base station.

11. A receiver section as claimed in claim 10, wherein the despread demodulator comprises:

a plurality of correlators operable in response to baseband signals of the baseband reception data signals to produce a plurality of correlator output signals;

a plurality of searchers responsive to the baseband signals for searching an appropriate path; and a rake receiver for combining the correlators output signals into a combined signal;

the control portion cooperating with the plurality of the searchers to operate the searchers within only the candidate slots in the next frame.

12. A receiver section as claimed in claim 10, wherein the calculator comprises:

a rate judgment portion for judging the frame rate in the next frame in response to information related to the predetermined frame; and a data burst randomizer coupled to the rate judgment portion for indicate the candidate slots in the next frame.

13. A receiver section as claimed in claim 12, wherein the calculator further comprises:

a spreading code generator coupled to the data burst randomizer for supplying the data burst randomizer with a predetermined spreading code to make the data burst randomizer produce burst candidate slot information representative of the candidate slots.

14. A receiver section as claimed in claim 13, wherein the calculator further comprises:

an enable signal generator for generating a burst search enable signal when the mobile terminal executes a handoff operation; and means for supplying the burst search enable signal to the control portion.

15. A receiver section as claimed in claim 10 wherein the control portion comprises:

a holding circuit for holding a search request;

a register for storing burst candidate slot information representative of the candidate slots in the next frame to produce a sequence of candidate slot bit signals bit by bit; and a logic circuit for logically processing the search request and the candidate slot bit signal sequence to sequentially indicate the candidate slots.

16. A receiver section as claimed in claim 15, wherein the logic circuit comprises:

an OR gate for carrying out a logical OR operation between the candidate slot bit signal sequence and a burst search enable signal which is produced when the mobile terminal executes a handoff operation, and an AND gate responsive to an OR gate output signal and the search request for carrying out a logical AND operation between the OR gate output signal and the search request to indicate the candidate slots.

17. A receiver section as claimed in claim 9, the CDMA system being for use in communication between a base station and a mobile terminal, the receiver section being used in the mobile terminal.

18. A CDMA system comprising a receiver section which is operable in response to a sequence of baseband reception data signals to control a searcher included in a despread demodulator, the transmission data signal sequence being divisible into a plurality of frames each of which is divided into a plurality of slots and which has a frame rate determined by the number of the slots including the baseband reception data signals, the receiver section comprising:

a calculator, operable in response to the transmission data signal related to a predetermined one of the frames, for calculating candidate slots in a next frame following the predetermined frame; and a control portion for controlling the searcher to make the searcher execute search operation within only the candidate slots in the next frame.

* * * * *